April 12, 1955  D. B. VINCENT  2,705,842
DEHYDRATING APPARATUS
Filed March 28, 1952  3 Sheets-Sheet 1
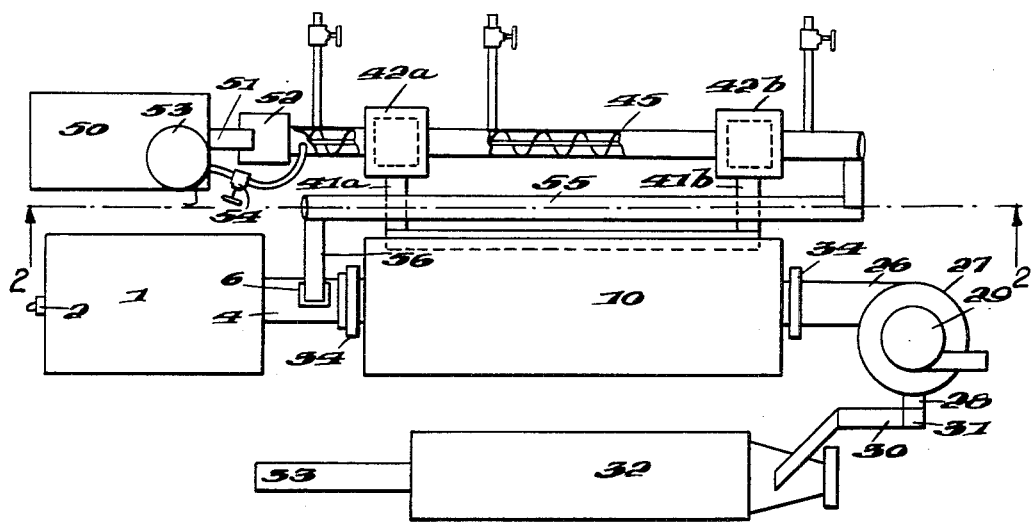
Fig. 1.
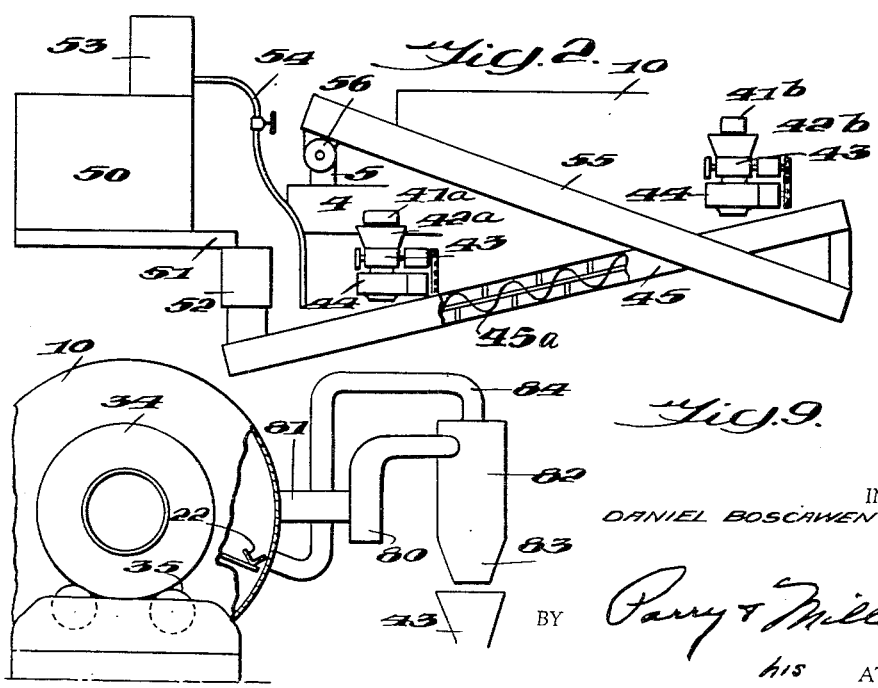
INVENTORS
DANIEL BOSCAWEN VINCENT,
BY Parry & Miller
his ATTORNEYS

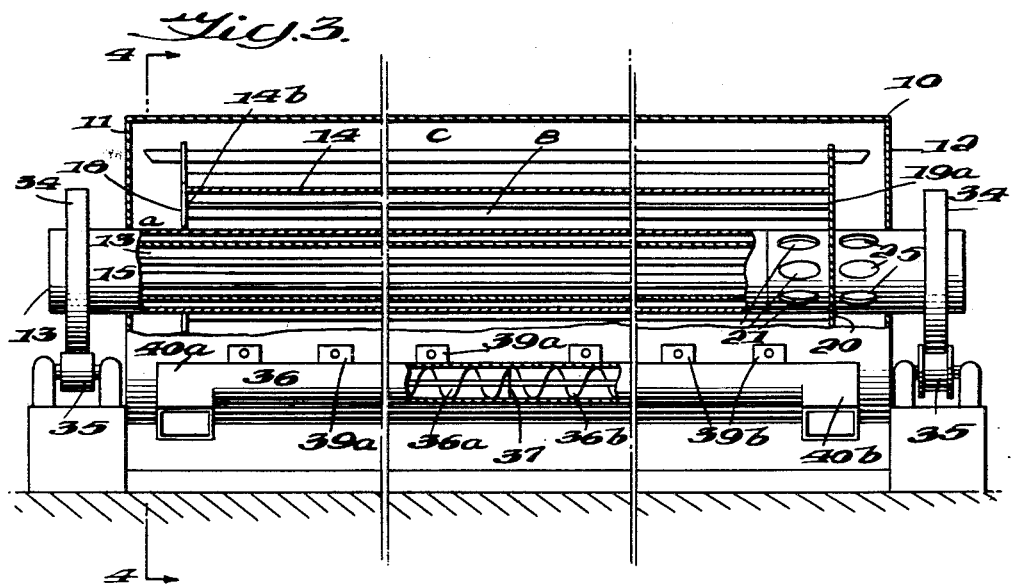
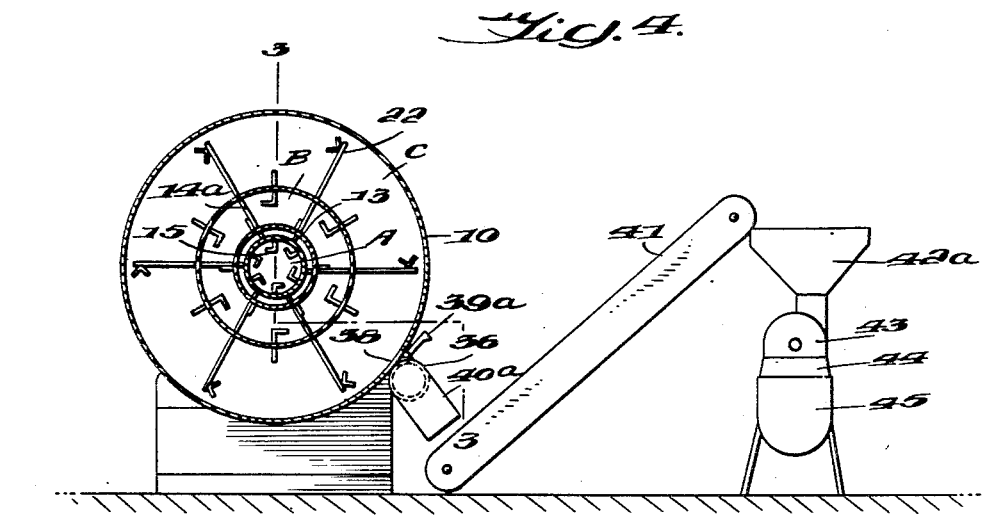
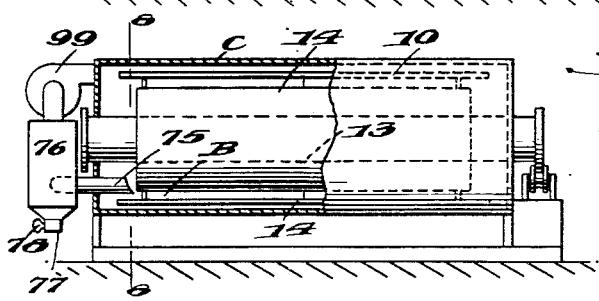

April 12, 1955 D. B. VINCENT 2,705,842
DEHYDRATING APPARATUS
Filed March 28, 1952 3 Sheets-Sheet 3
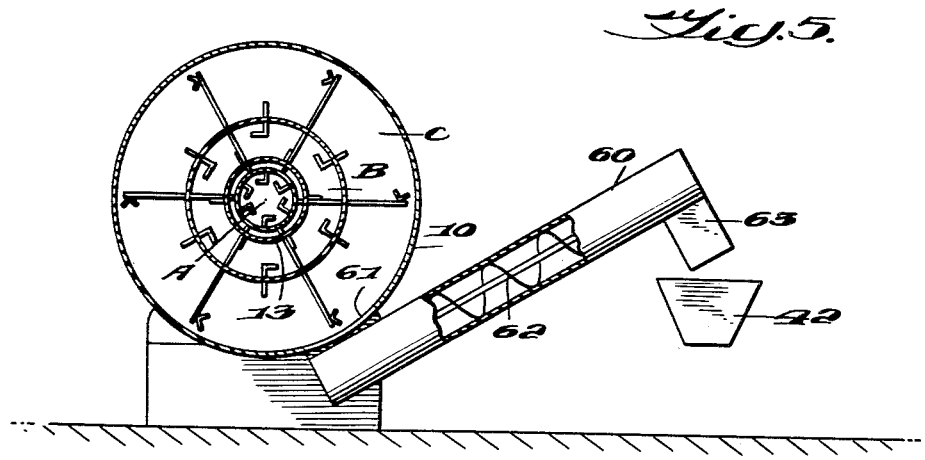
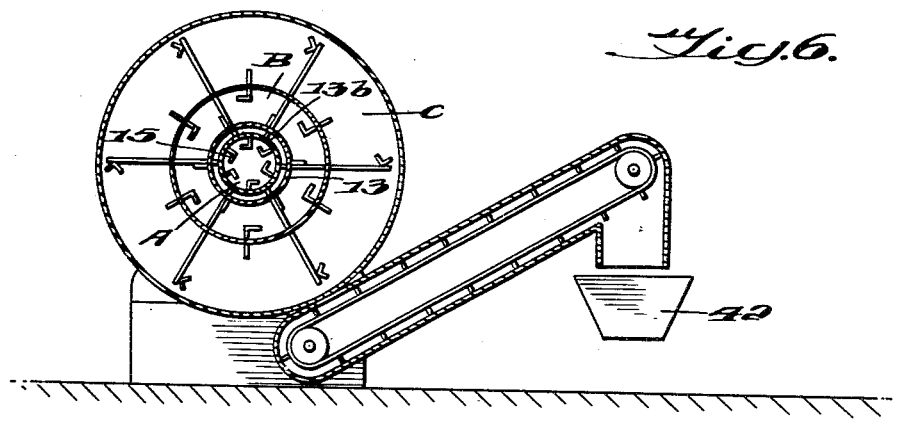
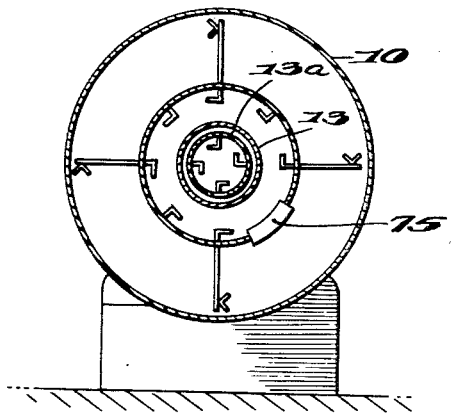
INVENTORS
DANIEL BOSCAWEN VINCENT,
BY Parry & Miller
his ATTORNEYS

United States Patent Office 2,705,842
Patented Apr. 12, 1955

2,705,842

DEHYDRATING APPARATUS

Daniel B. Vincent, Tampa, Fla., assignor to Prentice E. Edrington, Washington, D. C.

Application March 28, 1952, Serial No. 279,050

4 Claims. (Cl. 34—102)

The present invention relates to a new and improved apparatus for dehydrating agricultural, cannery waste and like materials for the preservation of such materials or for the production of stock feeds and the like, and the invention aims generally to improve existing apparatus for that purpose.

It has long been known that many agricultural and cannery wastes provide a suitable source for desirable foodstuff particularly for stock and poultry feeds suitably dehydrated to be preservable. Difficulty has, however, been experienced heretofore in satisfactorily dehydrating many agricultural and cannery wastes due to the difficulty of producing a uniformly comminuted and dehydrated product containing the pulpy and soluble dietary solids in substantially the original proportions existing in the original waste or to the inability to retain the original dietary solids of the waste when treated and pressed so as to be uniformly dehydrated.

For example, the waste from citrus, peach, pear and like canneries is a suitable source for a desirable stock feed but is very difficult to dehydrate to uniform consistency. These materials usually contain from 80 to 95 percent moisture; of the remaining solids from 50 to 60 percent are such low fibre, sticky solids as sugars and pectins. The presence of these sugars and pectins, particularly when the waste is comminuted or shredded, causes the waste to stick to the walls of the drier and burn or to ball up when being dried in a rotary drum drier which is generally recognized as the most economical drier for commercial dehydration of such materials. The balled up masses or pellets become case-hardened or caramelized on the outer surfaces and though apparently dry from outside appearance are highly moist in the interior. As a result, these balls or burned particles which normally constitute a substantial portion of the waste were undesirable as a feed, and usually were screened off and discarded.

As a result of the above stated conditions, commercial practice has been to first remove a substantial portion of the soluble solids and moisture by pressure and in some instances, for example citrus waste, to first chemically treat and to render it mechanically pressable. While it was possible to uniformly dry such pressed waste, the resultant dried products were deprived of the soluble solids which were removed in the press waters. Many fruit wastes, such as pear, apple and peach waste, were not readily pressable and dehydrated feedstuff from such wastes have only been produced commercially by relatively costly processes difficult to control.

Also, many leafy vegetable wastes, such as beet top, celery top, lettuce waste and the like are desirable materials for stock feeds. They contain high amounts of water disposed through the broad leaves and more juicy stems. In preparation for commercial drying such wastes are usually put through an ensilage cutter and comminuted into small pieces of one-half to one inch in length. The drying of such material to any substantial uniform degree is very difficult since many small succulent branches of the stem which cannot be dried uniformly are embedded in the thick leafy material. When this chopped leafy material containing pieces of wet thick stems and thin leaves was passed through a drier, the leaves quickly became dry on the outer edges and progressively less dry towards the stem and always the leaf would be burned before the stems could be satisfactorily dried.

A primary object of the present invention is the provision of an improved apparatus for efficiently dehydrating the above and other similar materials.

A further object of the invention is the provision of apparatus for the dehydration of comminuted materials of high moisture content, which apparatus is provided with means for mixing raw material with partially dehydrated material to materially reduce the moisture content of the mass for subsequent final dehydration in said dehydrating apparatus.

A still further object of the invention is the provision of an improved triple-stage drier for satisfactorily dehydrating highly moist material that is normally too watery or sticky for satisfactory dehydration.

A still further object of the invention is the provision of an improved dehydrating apparatus including a triple-stage rotary drier in which the weight of material being processed exceeds by as much as approximately seven times the weight of material passing through the final dehydrating stage for reducing the power requirements for operating the drier as well as increasing the efficiency thereof.

A still further object of the invention is the provision of a multiple-stage rotary drum drier suitable for drying sticky material in which the drum of the initial drying stage is provided with an air cooled wall to minimize and reduce the tendency of the material to stick to and build up on the walls of said initial drying stage drum.

A further object is to provide means to continuously remove partially dehydrated material from the current of material being dehydrated for mixing with inbound new material and simultaneously continuing the drying process on the material that was not removed from the drier.

The above and other objects of the invention will be easily understood and appreciated by persons skilled in the art to which the invention relates from a consideration of the accompanying drawings and annexed specification illustrating and describing preferred forms of apparatus for practicing the invention.

In the accompanying drawings—

Fig. 1 is a diagrammatic top plan view of one form of apparatus suitable for practicing the method;

Fig. 2 is a diagrammatic elevational sectional view thereof as taken on the line 2—2 of Fig. 1;

Fig. 3 is a longitudinal sectional elevation of the drier drum, parts being shown in side elevation to more clearly illustrate the construction of the recycle conveyor;

Fig. 4 is a transverse section thereof as taken on the line 4—4 of Fig. 3;

Figs. 5 and 6 are transverse sectional views showing further modified forms of recycle conveyors;

Fig. 7 is a longitudinal sectional elevation of one form of rotary drier provided with a pneumatic recycle conveyor for practicing the method;

Fig. 8 is a transverse sectional view as taken on the line 8—8 of Fig. 7; and

Fig. 9 is a transverse sectional view of a modified form of recycle conveyor for recycling substantially dehydrated fines from the drier.

According to the invention, the dehydrating apparatus may be supplied with hot gases from a suitable source comprising a furnace 1 of conventional construction fired by suitable means subject to variable control, as for example a fuel oil burner 2, and discharging its products of combustion into the furnace 1.

The products of combustion of the furnace are delivered through a hot air duct 4 leading directly to the inlet end of a rotary drum drier and material to be dehydrated may be fed into this hot air duct supplied by a spillway or chute 5 and controlled by a rotary airlock 6 as is usual in the art.

The rotary drum drier is preferably a multiple-stage drier herein illustrated of the triple-chamber rotary drum type, providing a plurality of zones or concentric chambers A, B and C for the successive stage drying of material conveyed therethrough by a subatmospheric current of hot gases.

Preferably the drier comprises a stationary casing 10 (Figs. 3 and 4) substantially circular in cross section having end walls 11—12 at the inlet and discharge ends, respectively. Rotatably mounted within the casing 10 are a series of concentric drums herein illustrated as comprising an inner drum 13 and an intermediate drum 14. The inner drum 13 comprises a tubular casing having end portions extending through the end walls 11—12 providing at one end an inlet end surrounding and aligned with the discharge end of the hot air duct 4 and a discharge outlet at the opposite end. The inner face of the drum 13 is preferably provided with a cylindrical liner 13ª spaced therefrom which is provided with inwardly extending inwardly disposed paddles or shelves 15 adapted to repeatedly tumble material to be dried by repeatedly lifting and dropping it across the current of hot drying gases passed through the liner. The intermediate drum 14 is preferably an imperforate cylindrical shell surrounding the inner drum and spaced therefrom by supporting members 14ª. The drum 14 is preferably of less length than the casing 10 and has an open end 18 adjacent to the end wall 11 and closed end 19ª adjacent the end wall 12. The inner drum 13 preferably is provided with an end wall or partition 20 in line with the closed end 19ª of the intermediate drum, and a series of outlet openings 21 provide a passage between the inner drum and the intermediate drum for passage of the material being dehydrated. The open end 18 of the intermediate drum is preferably spaced from the end wall 11 of the fixed casing 10 providing therebetween a passage for partially dehydrated material to the final dehydrating chamber C.

The intermediate drum 14 preferably has attached to the outer surface thereof a plurality of radially disposed blades 22 which may be provided at their outer edges with a series of paddles and flexible wipers adapted to wipe along the inner concentric face of the fixed casing 10 and move the material in the final drying chamber C annularly around the casing, the material being conveyed longitudinally by the subatmospheric current of gases above referred to. The material in the final drying zone is drawn rearwardly of the casing 10 toward the fixed end 12 and is discharged through openings 25 in the portion of the inner drum rearwardly of the plate 20. The rear end of the inner drum 13 is rotatably mounted in communication with the discharge outlet 26 leading to the collector 27 having a discharge outlet and airlock 28 at the lower end thereof. The collector is supplied with suction by means of a fan 29 at the top thereof of sufficient capacity to create a negative pressure conveying current for the products of combustion successively through the series of dehydrating chambers. The dehydrated material passes through the discharge outlet 28 of the collector 27 through airlock 31 into bucket elevator 30 from which it is delivered to a cooling reel 32 and then to a sacker 33.

It will be seen that the inner drum 13, which supports and carries the intermediate drum 14 and which is of greater length than the casing 10, provides means for rotatably mounting and rotating the cylinders of the drier. Each end of drum 13 is provided with tires 34 mounted on rollers 35 one or both of which may be driven to provide a rotative force for said drums or the drums may be driven by other means, for instance through a sprocket or gear attached to one end of drum 13. As the inner drum is of relatively small diameter and the rotative force is supplied thereto, a minimum of power is required to rotate said drums and to repeatedly lift the material therein. This will be apparent because the heaviest load and wettest material is close to the axis of rotation and the lever arm therefor is very short, and this permits the drier to be operated at a comparatively higher speed than conventional rotary driers and enables material to be thrown over and laid upon descending shelves, thereby distributing the load on both sides of the machine.

According to the invention, material is recycled from an intermediate drying stage, for reinsertion into the inlet 4 intermixing with fresh material, and preferably I recycle hot partially dried material as it emerges from the intermediate drying chamber B or from the final drying chamber C of the drier in the following manner:

Secured to the bottom of the casing 10 (see Figs. 3 and 4), preferably at about 30 degrees from the vertical axis, is an elongated conveyor housing 36 extending for a substantial length of the drier casing. The housing 36 may be provided with a central partition 37 dividing the housing into left and right conveyor sections adapted to receive partially dehydrated material from the final drying chamber of the drier through openings 38 in the casing 10 controlled by slide valves 39ª, 39ᵇ communicating respectively with the conveyor sections 36ª and 36ᵇ. The conveyor sections are preferably provided with rotatable screws or helixes 36ª and 36ᵇ respectively, to feed material in opposite directions toward the terminal ends of the housing 36 from which it is discharged through rotatable airlocks 40ª and 40ᵇ, respectively, which excludes the ingress of outside air into the drying system. The valves 39ª and 39ᵇ are adjusted so as to extract from the drying system variable amounts of partially dehydrated material required for best results with the particular material being processed.

Partially dried recycled material is discharged through the airlocks 40ª and 40ᵇ from the conveyor sections 36ª and 36ᵇ and is delivered into elevating conveyors 41ª and 41ᵇ which may be either of the screw type or paddle type, designed to convey the material laterally and upwardly and eventually through the chute 5. When the recycle material is to be mixed with fresh, more moist material it is delivered to the recycle hoppers 42ª and 42ᵇ and thence through variable delivery devices 43, which may be a simple gate valve or more preferably a motorized rotary valve capable of uniformly delivering varying amounts of material, to a suitable grinder 44 in which any damp lumps, balls or pellets of material formed in the drier may be broken up to retain the recycled material in its most absorbent form. Obviously the grinder 44 may be omitted if the material being dried is of such nature that there is little or no tendency to ball up or form pellets. The ground or broken up material is delivered from the grinder 44 into a mixing conveyor 45 which preferably is part of the material-feeding mechanism of the system.

Raw material to be dehydrated may be delivered into a receiving bin 50 from which it is fed by a variable speed drive screw or like conveyor 51 to a shredding or comminuting machine 52, for example a hammer mill, in which it is comminuted to proper size and delivery to the mixer 45. The speed of the conveyor 51 need be only varied to increase or decrease the volume of raw material to be supplied to the system to assure a continuous supply of waste of required volume to the processing equipment.

In some instances the waste may be delivered to the processing plant in comminuted form, in which case it may be in a fluid, soupy condition capable of being pumped into a receiving receptacle or tank 53 from which it flows through a valve-controlled pipe 54 directly into the receiving end of the mixer 45, by-passing the comminuting machine 52.

The mixer is conveniently disposed alongside the drier casing 10 and preferably is a mixing conveyor inclined upwardly and extended under the grinders 44 of the spaced recycle hoppers 42ª and 42ᵇ (see Fig. 2). When the mixer is in the form of a conveyor it is preferably a screw conveyor designed to thoroughly mix the material and simultaneously convey it to and past the hoppers 42ª and 42ᵇ and may be a cut flight screw or a continuous screw provided with mixing blades and paddles 45ª as will be understood in the art. The raw material in the mixing conveyor 45 has mixed therewith hot partially dehydrated material recycled from the drum 10 as it passes under the hoppers 42ª and 42ᵇ or both, as may be desired. The amount of partially dried recycle material delivered to the mixing conveyor through hoppers 42ª and 42ᵇ should be sufficient to blot up all of the free or unbound liquids of the raw waste in the mixing conveyor so that a moisture balance is effected, converting the fluid soupy raw waste into a substantially uniformly mixed mealy consistency so that it will not adhere to the lifting blades or inner surfaces of the rotary drier. Usually such balance is effected by adding about equal amounts of hot recycle material to raw waste and thereby reducing the moisture content of the mixture to about 40 to 50 percent. Mixing and holding the mixed mass in the conveyors 55 and 56 should be continued for a period of time (usually about 7 minutes) to permit thorough absorption of surplus liquids into the partially dry recycle material. The intermixed mealy mass is then delivered through airlock 6 and chute 5 into the hot air duct 4 of the drier.

It will be readily understood that as the drier is a closed system and operates under a subatmospheric current of hot gases, the more completely dried particles of material will be separated from the mass by the current of drying gases and moved through the final dehydrating chamber C between intermediate drum 14 and outer casing 10, and will be continuously drawn therethrough and into the separating chamber 27 and through the discharge outlet 28 thereof.

The process may be carried out with only a single recycle mixing hopper instead of the two shown in Fig. 2, and in such case a different form of recycle conveyor for withdrawing hot partially dehydrated material from an intermediate position of the drier may be employed; i. e. a simple rotary valve. Alternate forms of recycle conveyors are shown in Figs. 5 to 9 inclusive.

In the form of the invention shown in Fig. 5 the recycle conveyor may comprise a conveyor housing 60 secured to the bottom of the drier casing 10 in line with an opening 61 therein adjacent the end 11 so as to receive partially dehydrated material emerging from the intermediate drying chamber B. The conveyor may be a screw conveyor, in which case the housing 60 has journalled therein a screw or helix 62 for conveying the material upwardly and laterally from the drier casing 10 as shown, and the screw or helix may be driven by a variable speed motor so as to vary the amount of partially dehydrated material delivered from the conveyor into the recycle hopper 42. The discharge of the material from the conveyor housing 60 to the hopper 42 is preferably through a motor driven airlock 63, preferably synchronized with the screw 62, and which prevents the admission of air into the closed system of the drier.

Alternatively, as shown in Fig. 6, the recycle conveyor may be of the belt and paddle type comprising a housing 65 secured to the drier casing 10 in a similar manner to the casing 60 of Fig. 5, and in which is mounted an endless belt 66 having a series of paddles 67 for moving the material upwardly to a discharge throat 68 from which it is discharged into the recycle hopper 42. In this form of conveyor the paddles 67 preferably wipe against the sides, top and/or ends of the housing 65 and thus serve as an airlock to prevent the ingress of outside air into the closed drying system.

In a further alternative form of recycle means shown in Figs. 7 and 8 the end 11 of the drier casing 10 may be provided with a nozzle 75 disposed near the bottom of the outer shell, preferably at about 30 degrees from the vertical axis of the drier. The nozzle 75 may be adjustable inwardly toward and from the end of the intermediate drying chamber B. The nozzle 75 is a suction nozzle communicating with a cyclone separator 76 having a discharge orifice 77 fitted with a rotary motor driven airlock 78. The material is sucked from the drier casing 10 as it spills from the intermediate chamber B into the separator by reason of suction created by fan 79 and the separated gases are returned to the drier at some position along the final pass in chamber C.

In some cases it is desirable to separate for recycle the lighter and more fully dehydrated portions of the material from the final drying chamber C of the drier. This may be accomplished, as shown in Fig. 9, by providing a suction fan 80 connected by means of conduit 81 to the interior of the casing 10 at a suitable place throughout the length of the drying chamber C, preferably on the horizontal axis of the drier. The hot gases and material removed through conduit 81 by fan 80 are discharged into a separator 82 from which the recycle material is discharged into the recycle hopper 42 through motor driven airlock 83. The hot drying medium having been relieved of its charge of lighter recycle material is then returned to the drying chamber C through duct 84. This latter duct 84 is so placed that the gases blown therethrough will blow material off of the paddle 22, effecting an air separation in front of the opening of the conduit 81. The heavier particles which cannot remain air-borne will fall down toward the bottom of the casing 10 in chamber C and will continue to be dehydrated as they are moved along chamber C.

One illustrative example of material that may be effectively dehydrated by the present invention is raw Irish or white potatoes. Such raw material contains about 80 percent moisture and 20 percent solids, mostly starches, and when comminuted to a fineness comparable to cornmeal is a soupy, fluid mass exceedingly difficult to dehydrate to a low moisture content of 9 percent or less. Such comminuted raw potato material may be economically and uniformly dehydrated in a triple-pass rotary drum drier of the type above described by intermixing for a period of time to permit a substantial absorption and moisture balance within the particles approximately equal parts by weight of hot partially dehydrated material withdrawn from the end of the intermediate chamber B and introducing the mixture into the spillway or chute 5. In such a triple-pass rotary drum drier, capable of removing about 6000 lbs. of water per hour, approximately 15360 lbs. per hour of mixed material may be fed into the chute 5, composed of 7680 lbs. of recycle material and 7680 lbs. of raw material. Approximately 2100 lbs. per hour pass through the final dehydrating chamber C to the separator so that approximately 9780 lbs. per hour emerge from the intermediate dehydrating chamber B from which the recycle material is withdrawn. Approximately 5580 lbs. of water are removed in the first and second passes and 420 lbs. of water are removed in the third pass to reduce the moisture content to 9 percent.

It will be seen from the above examples that by withdrawing 7680 lbs. per hour of recycle material from the drier a great proportion of the weight of material in the drier is confined close to the axis of the rotating parts, thus reducing the power requirements to a minimum. Also, by recycling such substantial portions of material a substantial saving in material is effected over a possible combination of dual- and triple-pass driers where the material must be separated from the gases between the driers, as there is always some loss of dust in a cyclone separator, usually about one percent. For example, if the 9780 lbs. of 20 percent moisture content material emerging from the intermediate pass were permitted to pass through the last pass C and be separated from the gases in cyclone 27 to obtain the 7680 pounds for recycle and the remaining 2100 be sent to a separate drier for final drying, the 1 percent separator loss would amount to 97.8 lbs. per hour. In the illustrated example of the present invention with 2100 lbs. of 20 percent moisture of material passing through the third pass from which 420 lbs. of water are removed to reduce it to 9 percent moisture, 1680 lbs. per hour are passed through the separator. A 1 percent separator loss of 16.8 lbs. per hour effects a savings of about 81 lbs. per hour.

When inherently sticky material is to be dried the provision of the inner liner 13ª for the inner drum 13 is highly advantageous. This liner 13ª is of a length to extend from the end of the drum 13 adjacent the end wall 11 to adjacent the outlet passage 21 leading to the intermediate drying chamber B. Due to the presence of the subatmospheric pressure current within the drier, a continuous stream of cool air is drawn through the space between the drum 13 and liner 13ª, thus cooling both of them and reducing the tendency of the materials to stick to them. Also, the main structural drum 13 which carries the tiers and other rotating parts is protected from excessive heat, thus reducing fatigue of that part.

The recycling dehydrator of the present invention is highly advantageous in the dehydration of a variety of materials in its simplicity of construction and flexibility of control to recycle a selected and predetermined amount of material at a varying predetermined moisture content to best suit conditions of the particular materials being treated.

While the invention has been illustrated and described by several forms of apparatus, it is to be understood that such embodiments are intended by way of illustration and not of limitation, as other variations and details of apparatus are contemplated within the scope of the invention as set forth in the appended claims.

I claim:

1. Dehydrating apparatus comprising in combination a multiple-stage subatmospheric pressure type drier having concentric inner, intermediate, and outer dehydrating chambers, means for establishing a current of heated gases successively through said chambers, inlet means in advance of said inner chamber through which material may be introduced into said current of gases, a discharge outlet in one end of said outer chamber for discharge of material which has passed through said outer chamber, means in said outer chamber ahead of said discharge outlet for continuously withdrawing selective quantities of partially dried material from said drier while permitting continuous movement of the remaining material through said outer chamber to said discharge port to complete the drying thereof, means for mixing said withdrawn material with material of higher moisture content and means for introducing the mixture into said inlet means.

2. Dehydrating apparatus comprising in combination a multiple-stage subatmospheric pressure type drier having concentric inner, intermediate and outer dehydrating chambers, the outer chamber of which is stationary, the inner and intermediate chambers being rotatable within said outer chamber, means for establishing a current of heated gases successively through said chambers, inlet means in advance of said inner chamber through which material may be introduced into said current of gases, an outlet in one end of said outer chamber for discharge of material that has passed through said outer chamber, air-locked means within the periphery of said outer chamber for withdrawing partially dehydrated material from said outer chamber while permitting the remaining material in said outer chamber to pass in said current of gases through said outer chamber and said discharge outlet, means for continuously mixing, blending, and holding said withdrawn partially dehydrated material with other moist material to form an homogeneous mealy mass and means for introducing said blended mass into the inlet of the drier in advance of said inner dehydrating chamber.

3. Dehydrating apparatus comprising in combination a multiple-stage drier having concentric inner, intermediate, and outer dehydrating chambers, means for establishing a current of heated gases successively through said chambers, inlet means in advance of said inner chamber through which material may be introduced into said current of gases, a discharge outlet for material passed through said outer chamber, means for withdrawing a portion of the material from said apparatus after it emerges from said inner chamber and before it passes from said outer chamber, said means being constructed and arranged to withdraw heavier partially dehydrated material of higher moisture content while permitting lighter material of lower moisture content to be carried by said stream of gases through said outer chamber to and through said discharge outlet, means for mixing the material so withdrawn with the raw material to be dehydrated to uniformly distribute the moisture throughout the mixture, and means for introducing the mixture into said inlet means for introduction into said current of heated gases.

4. Dehydrating apparatus comprising in combination a multiple-stage subatmospheric pressure type drier having concentric inner, intermediate, and outer dehydrating chambers, the outer chamber of which is stationary, the inner and intermediate chambers being rotatable within said outer chamber, means for establishing a current of heated gases successively through said chambers, inlet means in advance of said inner chamber through which material may be introduced into said current of gases, an outlet in one end of said outer chamber for discharge of material that has passed through said outer chamber, pneumatic means in the outer wall of said outer chamber for dividing the partially dried material within the chamber into two fractions and extracting a portion of one fraction from said outer chamber while continuously passing the remainder of the material through the outer chamber for final drying and passage to the outlet discharge port, means for adding the extracted material to new wet material for mixing, blending and holding the mass for a sufficient time to permit substantially uniform diffusion of moisture in the mass to form an homogeneous mixture, and means for continuously introducing the blended mass into the inlet of the drier.

References Cited in the file of this patent

UNITED STATES PATENTS

| | | |
|---|---|---|
| 634,200 | Cummer | Oct. 3, 1899 |
| 1,731,457 | Fasting | Oct. 15, 1929 |
| 2,000,971 | Manross | May 14, 1935 |
| 2,213,667 | Dundas et al. | Sept. 3, 1940 |
| 2,316,459 | Schmidt et al. | Apr. 13, 1943 |
| 2,351,870 | Newhouse | June 20, 1944 |
| 2,513,370 | Shaw | July 4, 1950 |
| 2,518,582 | Vincent | Aug. 15, 1950 |
| 2,522,704 | De Laval | Sept. 19, 1950 |
| 2,592,231 | Allstott | Apr. 8, 1952 |
| 2,617,529 | McGehee | Nov. 11, 1952 |

FOREIGN PATENTS

| | | |
|---|---|---|
| 85,101 | Germany | Jan. 24, 1896 |
| 505,427 | Germany | Aug. 20, 1930 |
| 701,130 | Germany | Jan. 9, 1941 |